United States Patent [19]

Matte et al.

[11] 3,908,716

[45] Sept. 30, 1975

[54] METHOD AND APPARATUS FOR DISTRIBUTING A LIQUID IN THE FORM OF A MULTIPLICITY OF DOSES

[75] Inventors: Claude Matte, Paris; Jean-Jacques Gener, Vitry-sur-Seine, both of France

[73] Assignee: Centre National de Transfusion Sanguine, Paris, France

[22] Filed: Mar. 14, 1974

[21] Appl. No.: 451,295

[30] Foreign Application Priority Data

Mar. 22, 1973 France .............................. 73.10392

[52] U.S. Cl. .................... 141/1; 23/253; 141/284
[51] Int. Cl.² ......................................... B65B 3/04
[58] Field of Search...... 141/95, 279, 284, 231–233, 141/198, 130, 89, 91, 90, 92, 1; 23/259, 253

[56] References Cited
UNITED STATES PATENTS
3,625,265    12/1971    Gilson ................................ 141/284

*Primary Examiner*—Houston S. Bell, Jr.
*Attorney, Agent, or Firm*—Larson, Taylor & Hinds

[57] ABSTRACT

A method and an apparatus are described for distributing a liquid in the form of a multiplicity of doses, in which the liquid to be distributed is taken by the end of a tube.

The apparatus comprises means for sucking liquid to be distributed into a tube, means for continuously delivering said liquid in the tube so that it wells up at the end of said tube, means for moving the end of the tube relatively to receptacles into which must be placed the doses to be distributed, and means for successively removing from the end of the tube, during the said relative movement, the liquid doses which the delivering means have caused to well up at said tube end.

8 Claims, 4 Drawing Figures

METHOD AND APPARATUS FOR DISTRIBUTING A LIQUID IN THE FORM OF A MULTIPLICITY OF DOSES

The invention has for its object the provision of a method and an apparatus for distributing a liquid in the form of a multiplicity of doses.

In automatic analysis apparatuses, particularly those involving chemical, biochemical immunological or other reactions for medical analysis purposes it is often necessary to have a multiplicity of doses of the same liquid sample for analysis in receptacles where the addition of an analysis reagent or reagents causes agglutination, flocculation, precipitation, colorimetric or similar reactions whose observation and/or the measurement of the reaction level provides the sought analysis results. In such apparatuses used for the successive treatment of a large number of samples, the means for distributing the sample in the form of a multiplicity of doses must operate automatically on the one hand and on the other it must be ensured that one sample does not contaminate another.

It is a general object of the invention to supply a method and an apparatus for distributing a liquid in the form of a multiplicity of doses suitable for use in an automatic analysis apparatus, respecting the conditions mentioned hereinbefore.

It is also an object of the invention to provide a method and an apparatus which ensure the operation of an automatic analysis apparatus with small or very small sample quantities. Therefore its use is particularly advantageous for automatically analysing physiological and/or biological liquids which may only be available in small quantities.

It is also an object of the invention to provide a method and an apparatus for performing the same by means of which a volume of liquid e.g, the sample to be analysed is very rapidly broken down into a multiplicity of doses of predetermined regulatable volume which are placed in receptacles for their subsequent treatment.

In this connection it is an object of the invention to provide a method and an apparatus ensuring the uniformity, with a high degree of accuracy, of the doses into which the initial liquid sample is broken down, making it possible to obtain reproducible analysis results using an automatic analysis apparatus.

The method accoding to the invention is characterised in that the liquid to be distributed is taken in a tube, in that the liquid is then continuously delivered so that it wells up at the end of the said tube, in that a movement is applied to the end of the tube relative to receptacles into which successively is discharged a dose of delivered liquid during the relative movement. An apparatus for performing the method comprises means for sucking the liquid to be distributed into a tube, means for continuously delivering the said liquid in the tube so that it wells up at the end of the said tube, means for moving the end of the tube relatively to the receptacles into which must be placed the doses to be distributed and the means for successively removing from the end of the tube, during the said relative movement, the liquid doses which the delivering means have caused to well up at the said tube end.

The invention will be well understood from the following description given as an example with reference to the attached drawings, wherein.

To fill the receptacles 10 of a plate 11 with doses of a liquid sample L contained in pipe T the invention functions to take a sample volume in a tube of a suction device, to continuously deliver the same to make it well up at the end of the said tube and, during the relative movement of the tube and receptacles 10, to successively discharge one dose into each receptacle.

Figure 1:
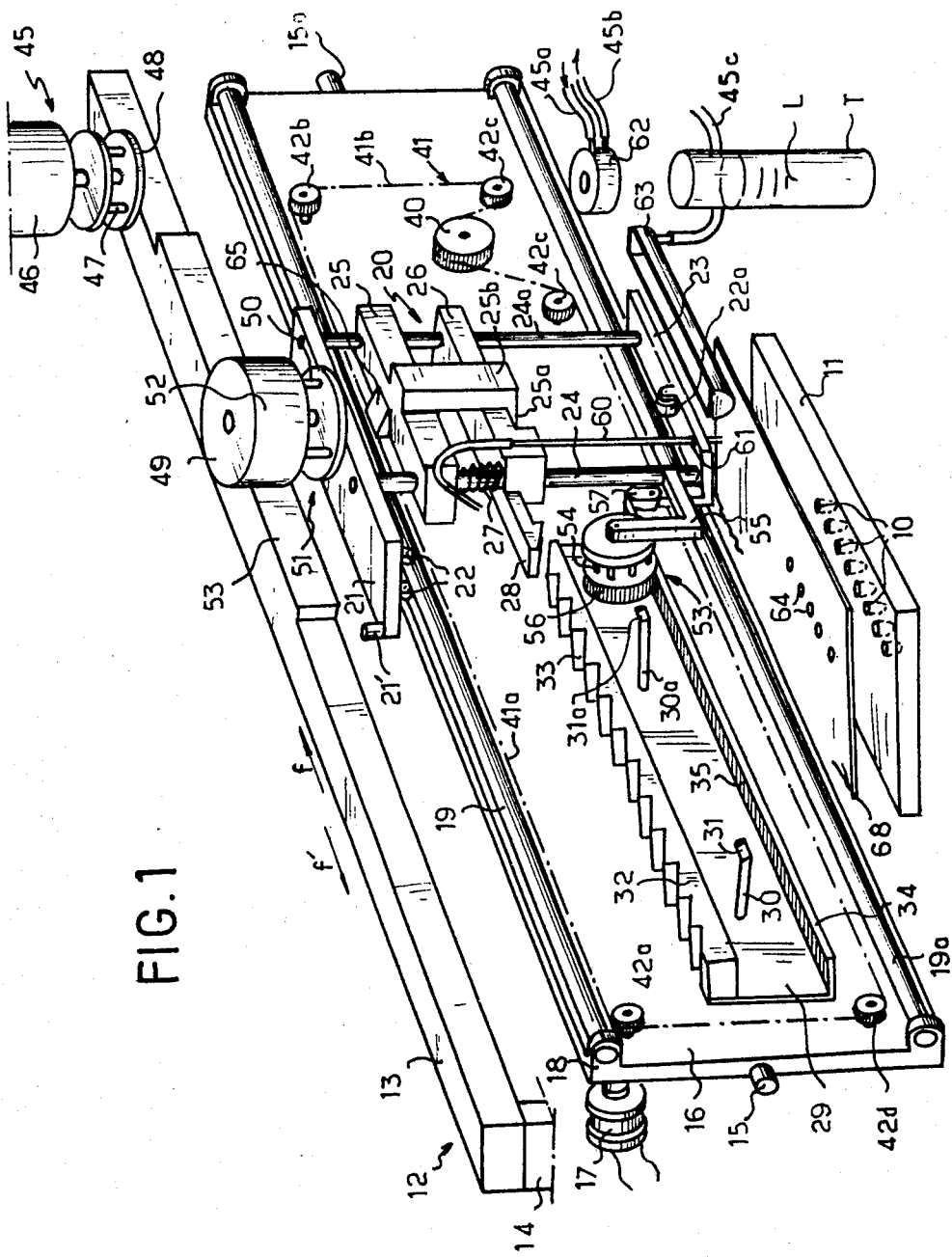
FIG. 1 is an overall perspective view of an apparatus according to the invention from which certain parts have been omitted for reasons of clarity.
Figure 2:
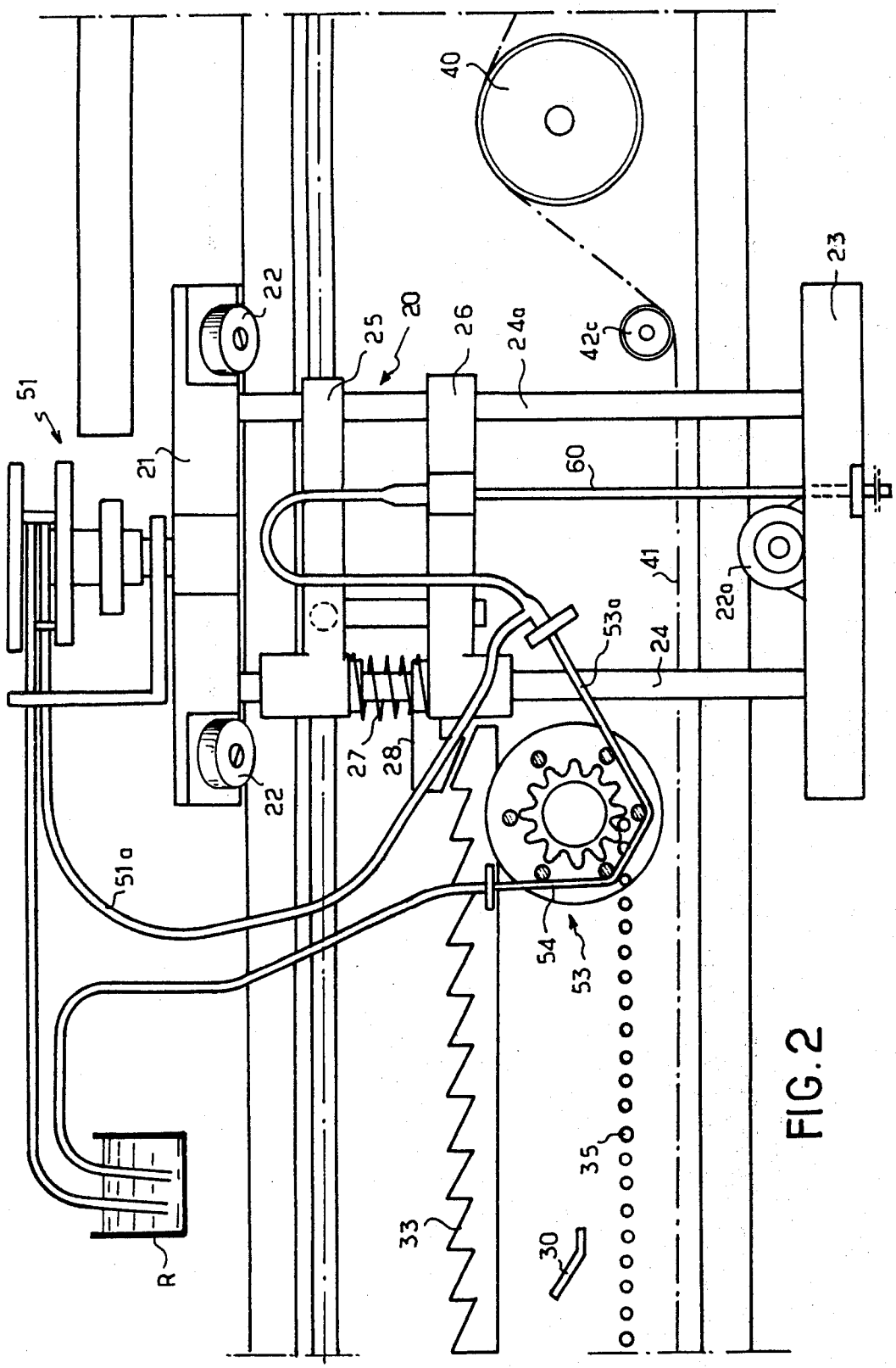
FIG. 2 is a partial view in elevation on a larger scale.

According to FIG. 1 an apparatus for performing the method comprises a rectangular frame 12 whose upper bar is shown at 13 and whose upright is shown at 14. On upright 14 and the opposite (not shown) upright is pivotally mounted by means of pivots 15, 15a a plate body 16 with which is associated an electromagnet 17 or mechanical cam path means 21' for maintaining the said plate body either in a vertical position or in a slightly inclined position relative to the vertical. In the four corners of plate body 16 are fixed collars 18 for securing two cylindrical bars 19, 19a extending in the longitudinal direction of the plate body and adjacent to the large sides thereof. Bars 19, 19a are provided for the guidance in translation of a carriage 20 comprising an upper plate 21 carrying bearings 22, a lower plate 23 carrying bearing 22a and two vertical rods 24, 24a interconnecting the two plates. Besides their connecting function rods 24, 24a serve for the sliding guidance on the one hand of a generally T-shaped member 25 and on the other of a plate 26 constantly kept spaced from member 25 by a spring 27 surrounding rod 24. However, this spacing is limited by plate 26 striking against a return member 25a of the vertical leg 25b of T-shaped member 25. A pawl 28 extending in the longitudinal direction of the apparatus is integral with plate 26.

On plate body 16 is mounted a rectangular plate 29 with parallel, inclined holes 30, 30a forming cam paths with which cooperate pins 31, 31a integral with plate body 16 and placed in said holes for controlling the raising and lowering of plate 29. The upper edge of the latter carries a bar 32 with saw teeth 33 and its lower edge is shaped as a return member 34 on the upper surface of which is provided a rack 35 whose position and pitch are such that there is a precise correspondence between the movement of pawl 28, suitable for cooperating with teeth 33 and the rotation of a wheel suitable for mashing with the rack 35 when plate 29 is in the raised position.

On plate body 16 is also mounted and connected to a motor (not shown) a drive wheel 40 for a chain 41 guided by guide rollers or pulleys 42a, 42b, 42c, 42d, 42e, whereby all but the last are arranged adjacent to the angles of plate 16 for defining a horizontal end of chain 41a adjacent to bar 19 and a vertical end 41b between pulleys 42b, 42c. Chain 41 which serves to control the movement of member 25 is connected to the latter by a pivot 65 fixed to one of its links and to the said member.

To bar 13 of frame 12 is fixed a delivering pump 45 driven by motor 46 whose rotor 47 carries on its flange 48 opposite to the said motor, mechanical clutch means (not shown) e.g., with catches or electromagnetic or the like adapted to cooperate with mating clutch means on the upper flange 49 of the rotor 50 of a second delivering pump 51 carried by carriage 20. Pump 51, which can thus be moved when it is perpendicular to pump 45 and when the clutch means are operational, can also be set in movement when, as will be described hereinafter, the cylindrical surface 52 of a flange integral with its rotor cooperates with a race 53 formed on a thickened portion of bar 13 of frame 12 which extends over part of the length of the said bar.

A third delivering pump 53 whose rotor 54 is carried by a support 55 fixed to plate 23 can be rotated when the toothed flange 56 of its rotor cooperates with the rack 35 i.e., when plate 29 is in its raised position in which it is brought by a pawl 57 carried by support 55, striking against the lower return member 34 of plate 29 during the movement of carriage 20 in the direction of arrow f', i.e., from right to left in the drawing.

Figure 4:
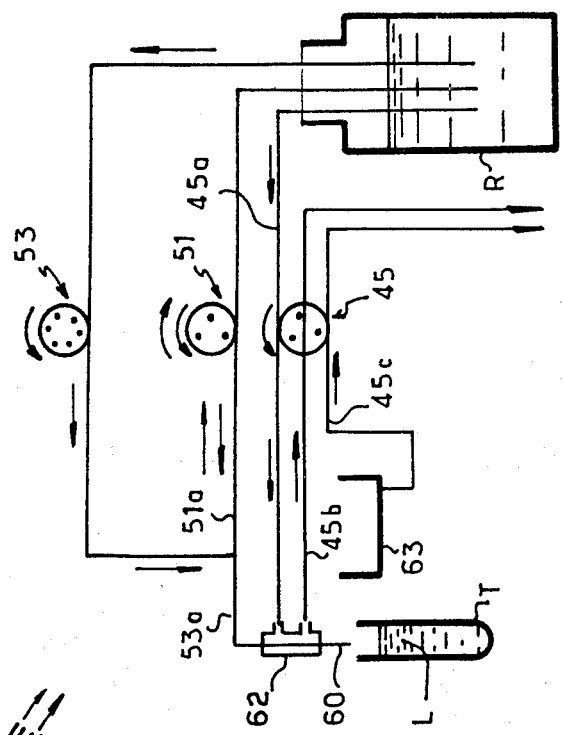
FIG. 4 is a diagram illustrating the method according to the invention and the apparatus for performing the same.
Figure 3:
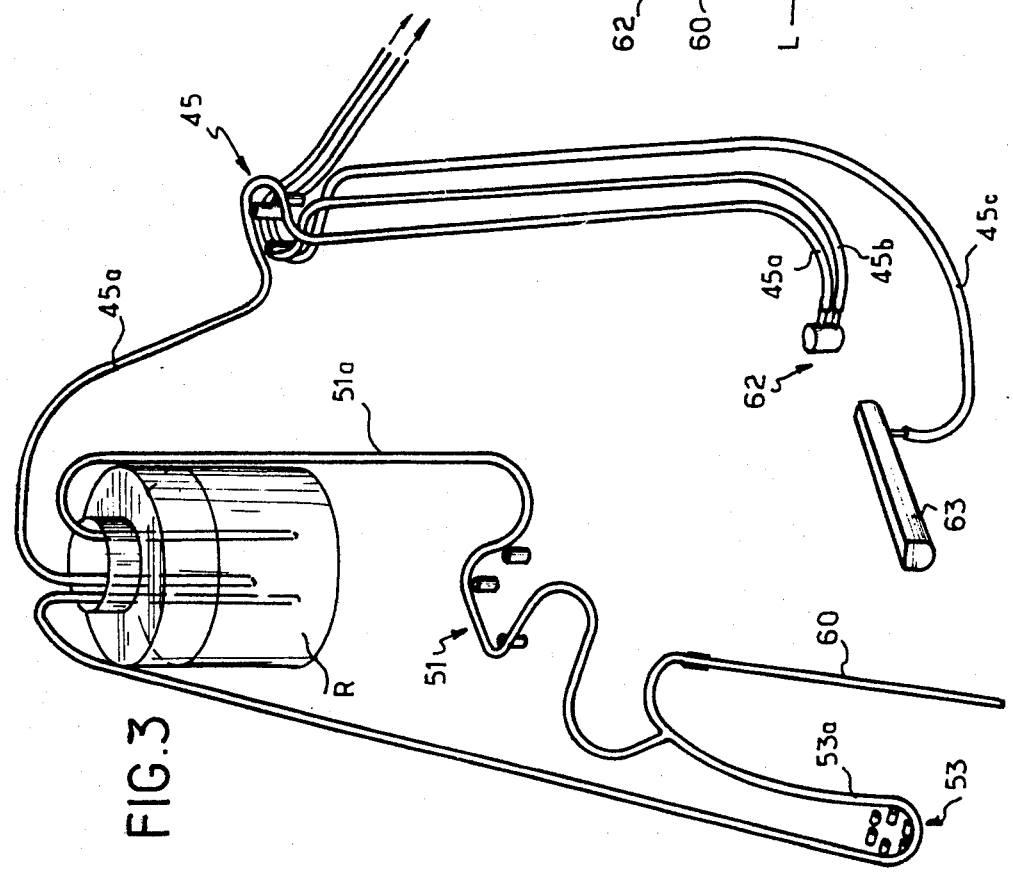
FIG. 3 is a schematic perspective view of the tube system of an apparatus according to the invention.

The tubes of pumps 45, 51, 53 are shown in FIGS. 3 and 4. On rotor 54 of pump 53 is placed a tube 53a whereof one end carries a probe 60 for sampling and distributing the liquid L to be divided up into doses. The probe 60 is guided by plate 26 and slides in a hole 61 of lower plate 23 of carriage 20. The other end of tube 53a is constantly immersed in a washing liquid reserve R, wherein is also immersed the end of a tube 51a placed on rotor 50 of delivering pump 51 and the other end of which issues into tube 53a. On rotor 47 of delivering pump 45 is placed a tube 45a one end of which issues into the washing liquid reserve R and the other end of which issues into a ring 62, fixed to frame 12, whose internal diameter is slightly larger than that of probe 60. The ring 62 is used for the external washing of the probe with liquid brought by tube 45a and taken up by a tube 45b which is also placed on rotor 47 of pump 45. The other end of tube 45b serves for discharge purposes, as does the end of a third tube 45c which is also placed on rotor 47 of delivering pump 45 and terminating at its other end with a channel 63 fixed to frame 12 and which receives the waste washing water within probe 60.

When the receptacles 10 to be filled with sample doses are made by moulding a plastic sheet 11, e.g., are formed by cells of a plate known by the trade name Microtiter the invention advantageously provides for the fixing to the frame 12 of a metal plate 68 with holes 64 whose diameter is substantially the same as the internal diameter of the receptacles 10 and which is positioned in such a way that when a plate 11 is brought to the sample filling station of an automatic analysis machines equipped with an apparatus according to the invention these holes face and are very close to the cells 10. Plate 68 which acts as a screen for the electrostatic field ensures the satisfactory filling of the liquid doses to be distributed.

The apparatus according to the invention operates as follows:

In the initial state a T-shaped pipe containing a sample of liquid L to be distributed is moved beneath rinsing ring 62 by a sample moving means of the analysis apparatus equipped with the device of the invention.

A plate 11 with receptacles 10 is placed beneath metal plate 68.

Carriage 20 is at the extreme right, in the drawing, of plate body 16 and probe 60 is perpendicular to ring 62 and the T-shaped pipe, whilst rotors 47 and 50 of pumps 45 and 51 face one another.

When a programmer (not shown), controls the rotation of the drive motor of wheel 40 in a rotation direction which moves chain 41 from left to right in the direction of arrow f the solidarisation of member 25 with chain 41 by means of pivot 65 controls a vertical downward movement of the said member and plate 26. Probe 60 is immersed in liquid L whilst passing through ring 62. During this downward movement motor 46 of pump 45 is rotated and the said pump causes to circulate in its tube 45a a certain volume of washing liquid from outside probe 60. This washing liquid with a certain volume of air is sucked in by tube 45b so that this liquid cannot fall into the T-shaped pipe. The rotation of pump 45 controlling the external washing of the probe continues during the stoppage of the latter when the chain 41 is stopped for a fraction of a second and also during the raising of probe 60 when chain 41 is driven with a movement opposite to that of the previous phase, i.e., in the direction of arrow f' by reversing the rotation direction of the drive motor for wheel 40.

During the stoppage of probe 60 in liquid L the mating clutch means 48, 49 are caused to operate and the rotation of pump 51 driven by motor 46 of pump 45 leads to the suction into the probe 60 of a quantity of liquid slightly in excess of that which is to be placed in the receptacles 10. At the start of the upward movement of member 25 which drives with it plate 26 by means of its leg 25b clutch means 48, 49 are made inoperative.

When pivot 65 passes through the horizontal end 41a of chain 41 carriage 20 moves from right to left on the drawing in the direction of arrow f'. The electromagnet 17 or cam members 21' are then in the inoperative condition so that the cylindrical surface of flange 52 does not cooperate with the antislip race 53.

When pawl 57 integral with lower plate 23 comes into contact with the return member 34 of plate 29 it causes the latter to move upwards which on the one hand causes flange 56 of the rotor of pump 53 to cooperate with rack 35 and, on the other, pawl 28 to cooperate with the teeth 33 of bar 32. The rotation of pump 53 compresses the liquid L to make it well up at the end of probe 60 by suction of the washing liquid by tube 51a, whilst for each fraction of a rotation of pump 53 pawl 28 imposes on probe 60 a to-and-fro movement with a rapid upward movement and abrupt downward movement, under the action of spring 27, when pawl 28 leaves a tooth 33. The sudden deceleration of the downward movement of the probe by plate 26 with which it is integral striking against return member 25a of leg 25b projects a drop or droplet formed at the probe end into receptacle 10, to the right of which the probe is then located.

When all the receptacles of one row have been filled and carriage 20 is at its extreme left-hand point on the drawing, the rotation direction of the motor associated with wheel 40 is reversed by the programmer and pawl 28 meshing with tooth 33 at the extreme left of bar 32 causes, during its movement in the direction of arrow f, a downward movement of plate 29, at the end of which it is removed from the said tooth. Pump 53 is made inoperative because its flange 56 no longer cooperates with rack 35.

When carriage 20 is again in its extreme right-hand position on the drawing the rotation direction of wheel 40 is again reversed to control a movement of the said carriage in the direction of arrow $f'$ and simultaneously the electromagnet 17 or the cam path means 21' are made operative, so as to make the plate body 16 rock around pivots 15, 15a on frame 12. Plate body 16 is then inclined slightly relative to the vertical which permits, during the movement from right to left of the carriage, the distribution of the sample doses L into a second row of receptacles 10, by a process analogous to that described hereinbefore.

During the return movement of carriage 20 from left to right on the drawing and when probe 60 no longer faces plate 11 the flange having a cylindrical surface 52 of pump 51 cooperates with the race 53 of bar 13 of frame 12 rotating pump 51 in a direction opposite to that in which it turned under the action of motor 46 of pump 45. Thus, the washing liquid sucked into tube 51a from reserve R is driven out when probe 60 is to the right of channel 63 which ensures the internal washing of the said probe. The waste water is then removed by tube 45c when, during the following phase, pump 45 is again made operative.

This phase starts as soon as carriage 20 returns to its terminal position at the extreme right of the drawing. The electro-magnet 17 or cam path means 21' are then made inoperative to return the plate body 16 to its initial position e.g., by a not shown return spring or by gravity.

Member 25 is then again lowered causing on the one hand the external washing of probe 60 in ring 62 and the taking of a new sample in a pipe brought beneath the said ring to replace the previous T-shaped pipe.

The above-described process is resumed for filling two rows of receptacles of a new plate 11 which a mechanism on the analysis apparatus has substituted for the initially filled plate 11.

In an embodiment of the apparatus according to the invention, which has given satisfactory results, receptacles of a plate 11 are fitted with doses of the sample at the rate of about 8 receptacles per second.

In the described and represented embodiment pumps 51 and 53 are movable with probe 60 so that a single programmer is sufficient to control the drive motor of wheel 40 and electromagnet 17.

Obviously the invention is not limited to this embodiment. Thus, probe 60 alone can be movable, whilst pumps 51 and 53 can be fixed and controlled, as well as the drive wheel 40 and alectro-magnet 17 by a more complete programmer.

According to another embodiment pumps 51 and 53 are not delivering pumps but instead valve-operated syringes able to carry out the suction and delivering functions relative to the liquid to be distributed and the washing liquid, according to a process identical to that described hereinbefore.

However, in these embodiments, the tube 53a must be longer than that of the embodiment with the pumps shown in the drawings, making it more difficult to mechanically reproduce the characteristics of the discharged doses. The embodiment shown makes this possible due to the limited length of tube 53a, which is substantially not deformed by the movements of probe 60.

We claim:

1. A method for sequentially discharging into a multiplicity of containers fractions of a liquid material sampled from a liquid containing receptacle, comprising the steps of: dipping a probe forming a first end of tube means into said receptacle; sucking in liquid material to be sampled into said tube means through said probe by first pump means; removing said probe from said receptacle; sucking in a rinsing liquid at the end of said tube means opposite said probe by second pump means; displacing said probe above and along said containers while continuing to suck in said rinsing liquid whereby the liquid to be sampled is pushed toward the outlet of said probe where it forms a micro-drop attached to the probe; and suddenly relatively striking said probe to effect discharging of said micro-drop into a container which registers with the actual position of said probe when the same is suddenly relatively struck.

2. An apparatus for sequentially discharging into a multiplicity of containers fractions of a liquid material sampled from a liquid containing receptacle, comprising a support, frame means mounted on said support, means on said frame for guiding a movable carriage, said carriage supporting a displaceable probe for filling said containers, and supporting also pump and tube means for sucking into said probe and tube means at one end liquid material to be sampled and subsequently sucking in a rinsing liquid at an end of said tube means opposite said probe, means for driving said carriage along said frame, control means for said pump means, and means for controlling the movement of said probe, whereby the liquid sampled from the receptacle is pushed toward the outlet of said probe by the rinsing liquid sucked subsequently into said tube means and is formed as a successive series of microdrops at said probe outlet, from which the sampled liquid is dischrged into a container which registers with the actual position of said probe when the same is suddenly relatively struck, and means for suddenly relatively striking said probe at predetermined successive locations.

3. An appaatus according to claim 2, wherein said pump means comprise a first peristaltic pump cooperating with a first section of said tube means and a second peristaltic pump cooperating with a second section of said tube means which branches from said first section at one end thereof and which is immersed into a rinsing liquid reservoir at its other end.

4. An apparatus according to claim 3, further comprising means for rinsing the external surface of said probe prior to the dipping thereof into said receptacle and after the removing thereof from said receptacle, said rinsing means comprising an innerly perforated annular member connected to a rinsing liquid reservoir by a third peristaltic pump.

5. An apparatus according to claim 4, further comprising a channel member for collecting the rinsing liquid forced through said probe by said second pump means, said channel member having an outlet connected to a discharge end by a tube portion cooperating with said third peristaltic pump.

6. An apparatus according to claim 4, wherein said frame means is pivotally mounted about a horizontal axis on said support, which support carries said third peristaltic pump and further comprising clutch means associated with said third pump and adapted to cooperate with means associated with the first peristaltic pump so as to be rotatively driven in the direction corresponding to a sucking in action of the liquid to be sampled.

7. An apparatus according to claim 2, wherein said frame means carries a plate movable in a direction substantially perpendicular to the direction of movement of the carriage, said plate having a saw shaped upper edge constituting, with a pawl integral with support means for the probe, a means for suddenly striking said probe whereby a micro-drop formed at the outlet thereof is discharged into a container which registers with the actual position of said probe.

8. An apparatus for the distribution of a liquid in the form of a multiplicity of doses, comprising means for sucking liquid to be distributed into a tube, means for continuously delivering said liquid in the tube so that it wells up at the end of said tube, means for moving the end of the tube relatively to receptacles into which must be placed the doses to be distributed, and means for successively removing from the end of the tube, during the said relative movement, the liquid doses which the delivering means have caused to well up at said tube end, said suction means comprising a first delivering pump whereon is placed the tube into which is sucked the liquid to be distributed, one end of said tube being connected to a sampling probe, the other end being immersed in a washing liquid reserve, whereby the said tube has between the probe and the first pump a branch constituting the tube of a second delivering pump controlling the delivering of the liquid to be distributed.

* * * * *